(12) United States Patent
Zipprich

(10) Patent No.: US 11,602,416 B2
(45) Date of Patent: Mar. 14, 2023

(54) ABUTMENT, IN PARTICULAR FOR USE WITH A DENTAL IMPLANT INSERTED INTO THE JAW BONE OF A PATIENT, AND METHOD FOR PRODUCING THE ABUTMENT

(71) Applicant: Holger Zipprich, Malchen (DE)

(72) Inventor: Holger Zipprich, Malchen (DE)

( * ) Notice: Subject to any disclaimer, the term of this patent is extended or adjusted under 35 U.S.C. 154(b) by 362 days.

(21) Appl. No.: 16/075,040

(22) PCT Filed: Feb. 2, 2017

(86) PCT No.: PCT/EP2017/052301
§ 371 (c)(1),
(2) Date: Feb. 25, 2019

(87) PCT Pub. No.: WO2017/134185
PCT Pub. Date: Aug. 10, 2017

(65) Prior Publication Data
US 2019/0175310 A1    Jun. 13, 2019

(30) Foreign Application Priority Data

Feb. 4, 2016  (DE) ..................... 10 2016 102 009.5

(51) Int. Cl.
*A61C 8/00*   (2006.01)
(52) U.S. Cl.
CPC .......... *A61C 8/0068* (2013.01); *A61C 8/0056* (2013.01); *A61C 8/0069* (2013.01)
(58) Field of Classification Search
CPC ...... A61C 8/068; A61C 8/0056; A61C 8/0069
See application file for complete search history.

(56) References Cited

U.S. PATENT DOCUMENTS

| 4,756,689 A * | 7/1988 | Lundgren | .............. A61C 8/005 |
| | | | 433/169 |
| 5,328,371 A * | 7/1994 | Hund | ..................... A61C 8/005 |
| | | | 433/173 |

(Continued)

FOREIGN PATENT DOCUMENTS

| CN | 103550002 A | 2/2014 | |
| DE | 4028857 A1 * | 3/1992 | ........... A61C 8/0065 |

(Continued)

OTHER PUBLICATIONS

International Preliminary Report on Patentability for International Patent Application No. PCT/EP2017/052301, dated Aug. 16, 2018, 17 pages.

(Continued)

*Primary Examiner* — Nicholas D Lucchesi
*Assistant Examiner* — Hao D Mai
(74) *Attorney, Agent, or Firm* — Weitzman Law Offices, LLC

(57) ABSTRACT

An abutment for use with a dental implant. The abutment includes a connecting pin configured to be introduced into an associated receiving channel of the dental implant. The connecting pin includes a screw channel for a connecting screw for connecting the abutment to the dental implant. An inner diameter of the screw channel over its entire length up to an opening on an end face is at least as large as the diameter of a screw head of the connecting screw, and a plastically deformed retaining element is provided in order to support the connecting screw.

8 Claims, 14 Drawing Sheets

(56) References Cited

U.S. PATENT DOCUMENTS

Figure 2:
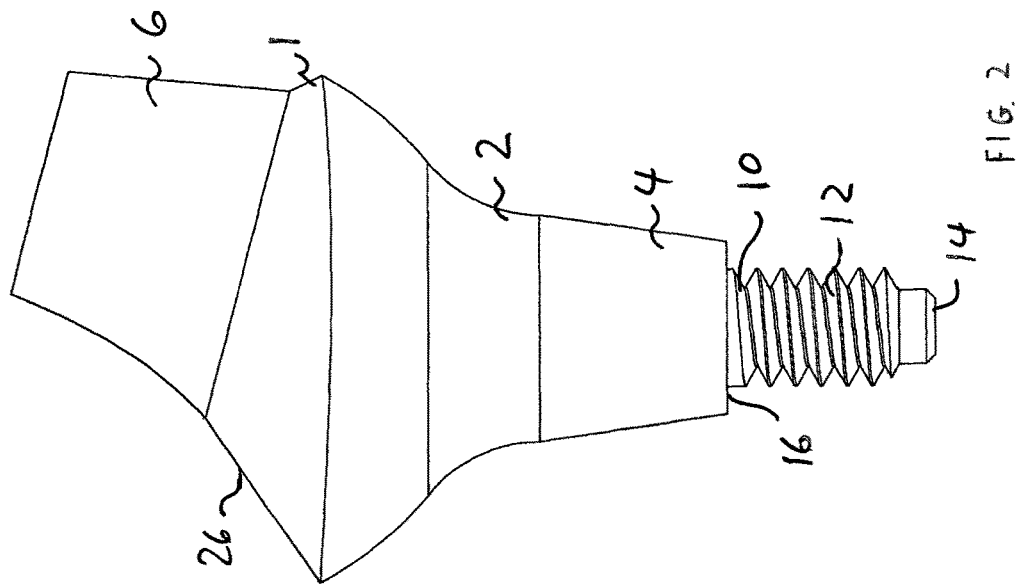

| | | | | |
|---|---|---|---|---|
| 5,368,483 | A * | 11/1994 | Sutter | A61C 8/0022 433/173 |
| 5,947,733 | A * | 9/1999 | Sutter | A61C 8/005 433/173 |
| 6,315,563 | B1 * | 11/2001 | Sager | A61C 8/0057 433/173 |
| 6,461,160 | B1 * | 10/2002 | Sutter | A61C 8/0012 433/172 |
| 6,663,388 | B1 * | 12/2003 | Schar | A61C 8/005 433/173 |
| 9,615,900 | B2 * | 4/2017 | Fischler | A61C 5/30 |
| 2002/0160334 | A1 | 10/2002 | Brodbeck | |
| 2003/0054318 | A1 * | 3/2003 | Gervais | A61C 8/0001 433/141 |
| 2003/0224328 | A1 * | 12/2003 | Sapian | A61C 8/0077 433/173 |
| 2003/0224330 | A1 * | 12/2003 | Aravena | A61C 8/0069 433/173 |
| 2006/0105296 | A1 * | 5/2006 | Linder | A61C 8/008 433/173 |
| 2007/0072150 | A1 * | 3/2007 | Mansueto | A61C 8/0022 433/174 |
| 2010/0203476 | A1 * | 8/2010 | Studer | A61C 8/006 433/173 |
| 2011/0097687 | A1 * | 4/2011 | Engman | A61C 8/0068 433/174 |
| 2013/0224689 | A1 * | 8/2013 | Ishiwata | A61C 8/0066 433/201.1 |
| 2014/0162212 | A1 * | 6/2014 | Mullaly | A61C 8/0068 433/173 |
| 2016/0302893 | A1 * | 10/2016 | Vukas | A61C 8/0054 |
| 2016/0338802 | A1 * | 11/2016 | Piasini | A61C 8/0016 |
| 2018/0325634 | A1 * | 11/2018 | Honig | A61C 8/0075 |

FOREIGN PATENT DOCUMENTS

| | | |
|---|---|---|
| DE | 102008055645 A1 | 4/2010 |
| EP | 1139906 B1 | 6/2006 |
| WO | 9714371 A1 | 4/1997 |
| WO | 2012146570 A1 | 11/2012 |

OTHER PUBLICATIONS

International Search Report and Written Opinion for International Patent Application No. PCT/EP2017/052301, dated Jun. 23, 2017, 15 pages.

* cited by examiner

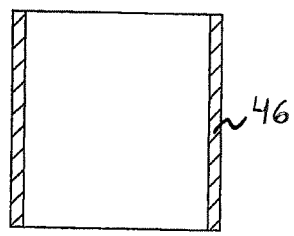
FIG. 16a
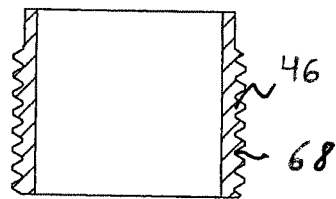
FIG. 16b
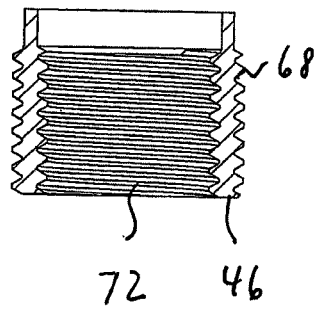
FIG. 16c
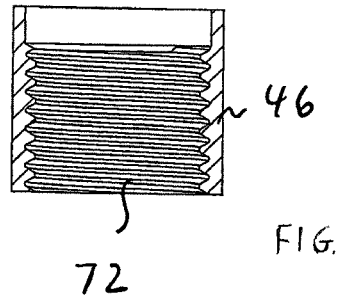
FIG. 16d
FIG. 16

ABUTMENT, IN PARTICULAR FOR USE WITH A DENTAL IMPLANT INSERTED INTO THE JAW BONE OF A PATIENT, AND METHOD FOR PRODUCING THE ABUTMENT

The invention relates to an abutment, in particular for use with a dental implant inserted into the jaw bone of a patient, comprising a connecting pin that can be introduced into an associated receiving channel of the dental implant, into which a screw channel for a connecting screw is integrated, provided for connecting the abutment to the dental implant. It also relates to a method for producing such an abutments.

To compensate for the loss of a tooth, dental implants can be used within the frame-work of the reconstructive therapy. Usually, they are inserted into the jaw bone in the place of an extracted or shed tooth, in order to fix there, after a healing-in phase of about four to twelve weeks, a prosthetic part or a crown serving as a denture piece. For this purpose, such a dental implant is usually designed as a suitably shaped metallic body, which is inserted in the intended place in the jaw bone by screwing it in. As a rule, the apical end of the dental implant is provided with a screw thread, mostly a self-cutting screw thread, with which the dental implant is inserted into the correspondingly prepared implant bed.

Contrary to single-part dental implants, in which the prosthetics serving as a denture piece is fastened directly on the metallic body screwed into the jaw bone, two-part or multi-part implant systems are also known and widely used. In such a multi-part dental implant system, a so-called abutment is provided in addition to the dental implant properly speaking to be screwed into the jaw bone of the patient, in the manner of a connection or transition piece, which abutment carries the prosthetics or crown provided as a denture piece. After the dental implant properly speaking has healed into the jaw bone of the patient, the abutment provided with the prosthetics is put on the dental implant in the manner of completing the implant system and is connected with the dental implant.

Such a connection of the abutment provided for attaching the prosthetics to the inserted dental implant is usually produced by means of a screwed connection. In order to guarantee a sufficiently high mechanical stability of the entire system in view of the chewing loads which are to be expected, the abutment is usually provided with a connecting pin, which can be introduced into an associated receiving channel in the dental implant, in the manner of a plug-in connection, and which guarantees, in assembled condition, a lateral and, if necessary, also an axial guidance and fixed positioning of the components relative to each other. Usually a screw channel for a connecting screw serving for connecting the abutment to the dental implant is integrated in this connecting pin. The connecting screw penetrates the screw channel and its outer thread engages into a corresponding inner thread formed in the dental implant, the screw head of the connecting screw resting on a counterbore in the abutment, arranged outside the screw channel, and, by means of said counterbore, pressing the abutment onto the post part when the connecting screw is being screwed in.

The prosthetics or denture piece properly speaking is usually attached on an assembly pin provided for that purpose, which is integrally formed on the base body of the abutment. Depending on the construction of the implant system, the prosthetics can be glued to said assembly pin or fastened thereto in another substance-locking way; alternatively, however, screw systems are also used, in which the prosthetics is fastened by means of a connecting screw. In that case, the latter engages into a thread arranged in the assembly pin. The space required for accommodating this thread entails, however, a reduction of the thickness of material in this area, which might lead to an undesired weakening and impairment of the mechanical strength of the system.

The invention is based on the problem to provide an abutment, in particular for use with a dental implant inserted into the jaw bone of a patient, of the above-mentioned type, which possesses a particularly high mechanical stressability and, therefore, also a long service life. Furthermore, a suitable method for producing such an abutment shall be provided.

With regard to the abutment, this problem is solved according to the invention by making the inner diameter of the screw channel over its entire length up to the opening on the end face at least as large as the diameter of the screw head of the connecting screw, a plastically deformed retaining element, which is introduced into the screw channel after the connecting screw, being provided in order to support the connecting screw.

The invention is based on the consideration that a high breaking strength and thus, a long service life, of the abutment can be achieved, also in view of the relatively high stress forces arising in connection with the chewing loads which are to be expected, by designing the structural construction of the abutment consistently with a view to avoiding mechanical weak points. It has turned out surprisingly that such a weak point might be due to insufficient material thicknesses, especially in the case of abutments having an inner thread in the assembly pin, which may occur for geometrical reasons in such an embodiment. Abutments of conventional construction, in which the connecting screw is introduced into the screw channel from "above", i.e. from the end facing towards the prosthetics, are provided with a corresponding counterbore or blind hole, whose free diameter is adapted to the diameter of the screw head of the connecting screw. The material available for providing the desired strength is given in this case by the material surrounding this blind hole.

An undesired impairment of the material strength which can be achieved in this way might arise due to the above-mentioned construction, in which the assembly pin provided for fastening the prosthetics has the inner thread and consequently a corresponding drill hole. Therefore, for geometrical reasons, the abutment may have spatial areas of relatively small material thickness, especially in the area where these integrated channels meet, which might reduce the breaking strength in an undesirable manner.

To counteract that, it is now provided to keep the material thicknesses relatively high in the above-mentioned spatial areas, regardless of the construction. To achieve this, the abutment is designed for not introducing the connecting screw and in particular the relatively wide screw head, as before, "from above", i.e. from that side of the abutment that faces towards the prosthetics, but rather "from below", i.e. from side facing towards the dental implant, into the abutment body.

This can be achieved by a "passability", whereby the screw head can be introduced into the screw channel and can be guided along the latter, due to a suitable choice of geometry. This can be achieved, in the sense of a linear movement, by a sufficiently large clear width of the cross-section of the screw channel or, alternatively and to the same effect, by threads on the outside of the screw head and and on the inside of the screw channel, which engage into each, with which a rotation of the screw head is transformed into a corresponding feed in the screw channel. It is just necessary to additionally provide an access channel of relatively narrow dimensions in the upper assembly area of the abutment, through which a suitable tool, such as, for example, a screw-driver, can be inserted and brought into engagement with the screw head of the connecting screw. This relatively narrow dimensioning of the channel in the assembly area of the abutment allows larger thicknesses of material and walls, so that the desired high strength of the abutment is given.

In order to enable a reliable fastening of the abutment on the dental implant by means of the connecting screw, even with this arrangement, the screw head of the connecting screw rests in an advantageous embodiment on a retaining element introduced into the screw channel after the connecting screw.

In this case, the retaining element itself advantageously also rests in a suitable way on the screw channel and thus on the base body of the abutment. In an advantageous embodiment, a support ring pressed into the screw channel is provided as retaining element. Said support ring can be introduced into the screw channel after introduction of the connecting screw and can then be plastically deformed in such a way that it is, on the one hand, reliably connected mechanically with the surrounding screw channel and, on the other hand, offers a reliable bearing surface for the screw head, on which the latter can rest.

In an alternative or additional advantageous embodiment, the retaining element can be screwed into the screw channel, preferably in the manner of a bayonet catch. In an alternative or additional advantageous embodiment, a support ring having a peripheral bead engaging in an associated peripheral groove in the screw channel is provided as retaining element. Said support ring can be designed in particular as a snap ring.

Shape and geometry of the abutment are usually suitably chosen in accordance with the therapeutical requirements. An abutment of the above-mentioned type can in particular be designed as a "straight-line" construction, in which the longitudinal direction or longitudinal axis of the assembly pin usually provided for fastening the prosthetics properly speaking is oriented substantially in parallel to the longitudinal direction or longitudinal axis of the connecting pin. Alternatively, the abutment can, however, also be of an angled design, in accordance with the therapeutical requirements. In such an angled construction, the longitudinal axis or longitudinal direction of the assembly pin is inclined against the longitudinal axis or longitudinal direction of the connecting pin by an inclination angle of, for example, 15° to 45°. Such systems can be used in particular when it is necessary to screw the dental implant into the bone in an "oblique" position, for example for anchoring the implant in the jaw bone in a mechanically stable manner, when the longitudinal direction of the implant has to be oriented obliquely relative to the patients remaining teeth.

In a particularly preferred embodiment of the present invention, the abutment is designed as an angled abutment and comprises an assembly pin provided for fastening a prosthetic element, whose longitudinal axis is tilted against the longitudinal axis of the screw channel by a tilting angle of 15° to 30°. Especially in such an angled construction, with an assembly pin having an inner thread, it is particularly probably that the material-free spatial areas, i.e. the screw channels or threads, overlap or intersect each other, thus causing undesired weak points on the material side, so that the advantages achieved by repositioning the screw seat come into effect particularly well. This effect is the more important the smaller the tilting angle is, so that the embodiment now provided according to the invention is particularly advantageous especially with small tilting angles of approx. 15°.

With regard to the method for producing the abutment, the above-mentioned problem is solved according to the invention by introducing the connecting screw, with its screw head ahead, into the screw channel of an abutment base body from the latter's front face provided for contact with the dental implant, a retaining element being then introduced into the screw channel in order to support the screw head and being fixed in the screw channel.

The advantages achieved with the invention consist in particular in that, due to the modified construction of the screw channel for the connecting screw, the areas of the screw channel having a relatively large free cross-section are shifted to that part of the abutment base body which faces towards the dental implant and and which is provided for connection to the dental implant. In this part of the abutment base body, the material thicknesses and, consequently, the strength values are usually relatively large, so that the drill hole for the screw channel with the now enlarged free cross-section does not cause any significant weakening of the material with ensuing impairment of strength. In the other part of the abutment base body, which is facing towards the prosthetics and which, for reasons of geometry, may have local areas of small material thickness, especially in case of an angled construction of the abutment and corresponding guidance of the inner channels, only an access channel is required for the driving tool, such as, for example, a screw-driver, for the connecting screw, which access channel can have a clearly reduced inner diameter.

Figure 1:
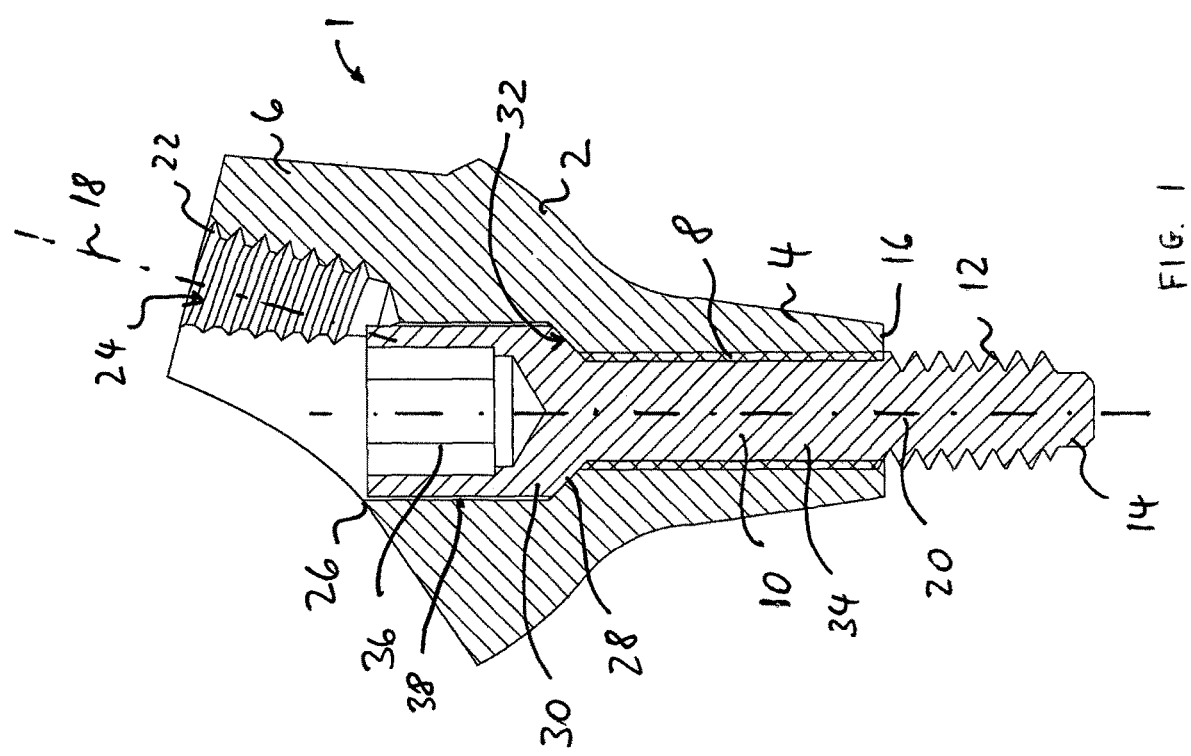
Figure 4:
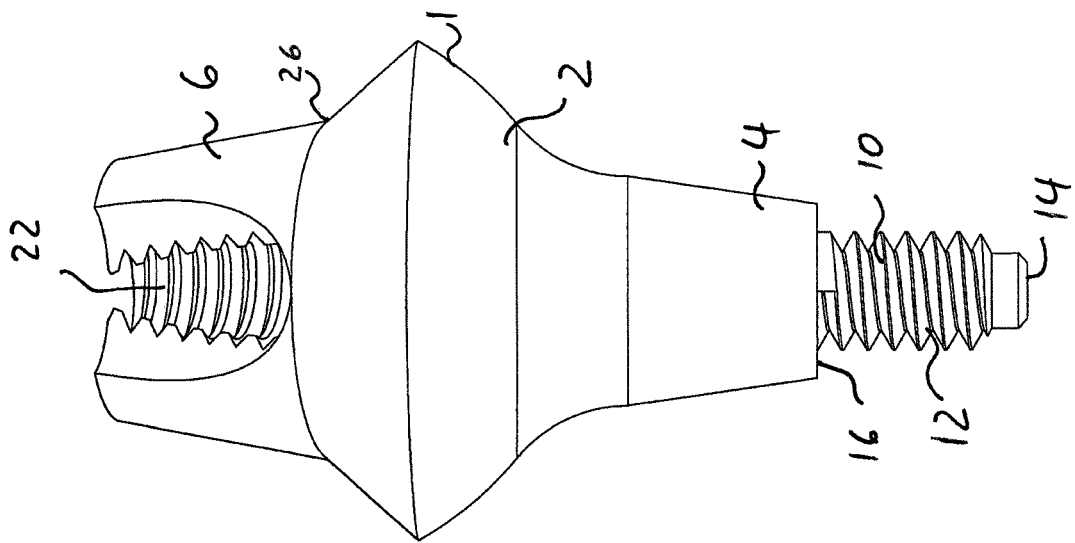
Figure 3:
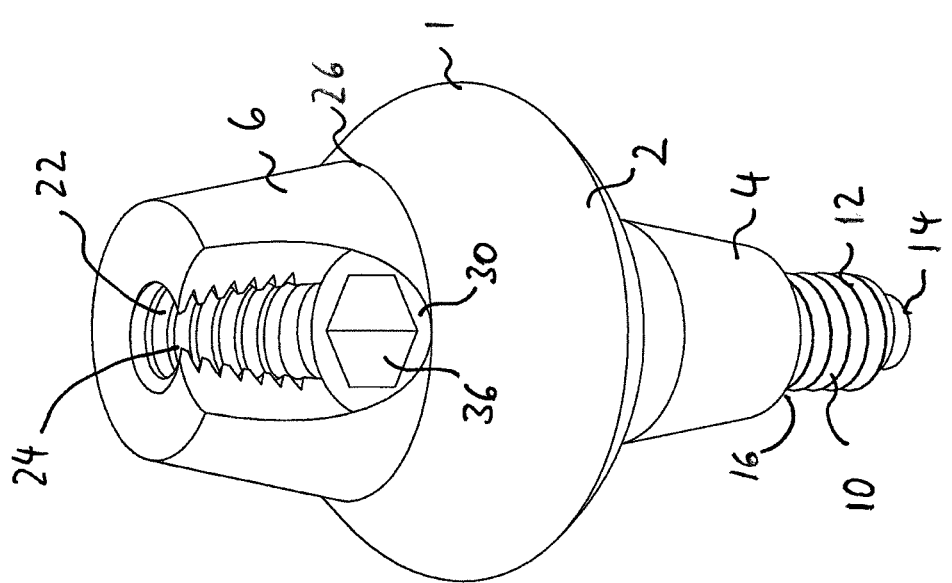
Figure 6:
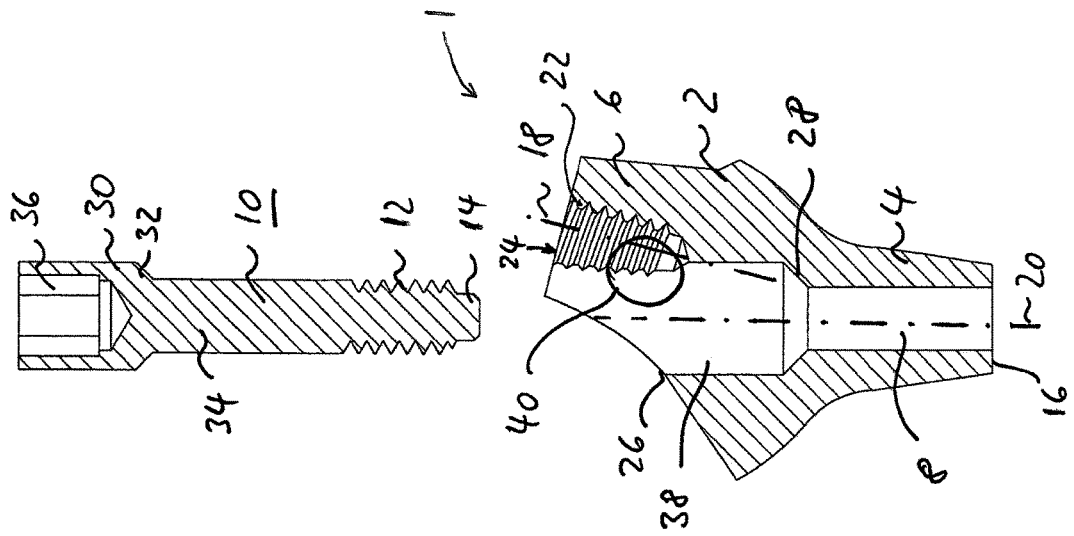
Figure 5:
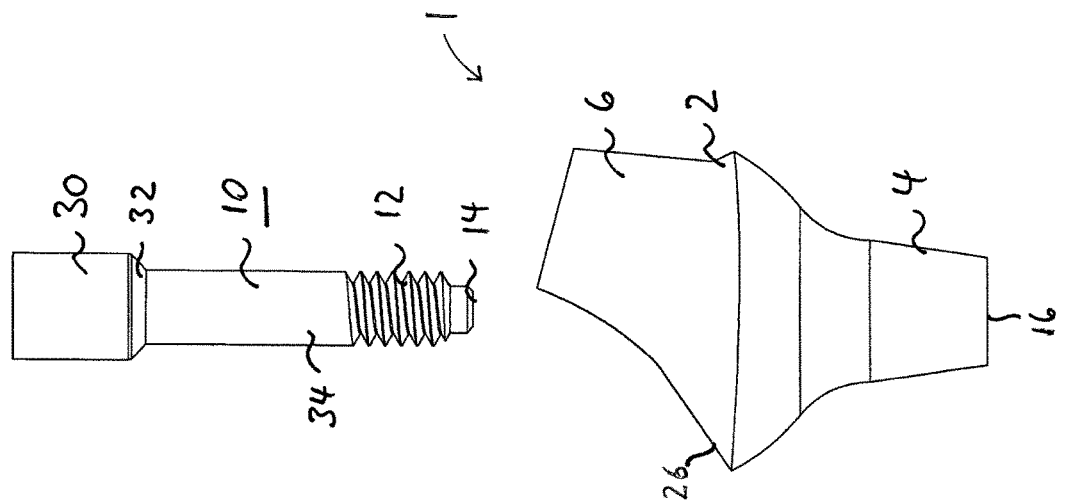
Figure 8:
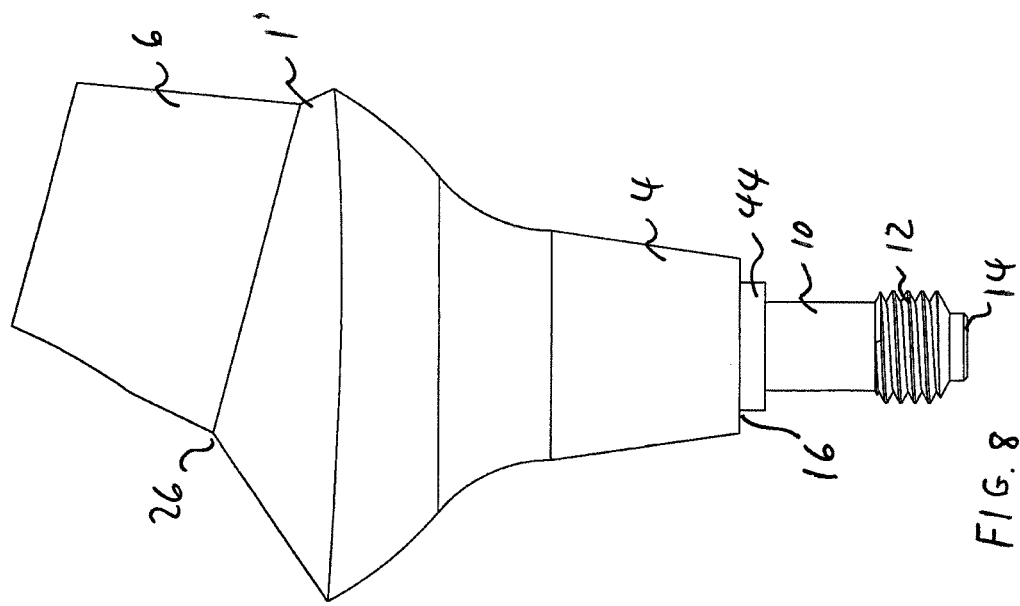
Figure 7:
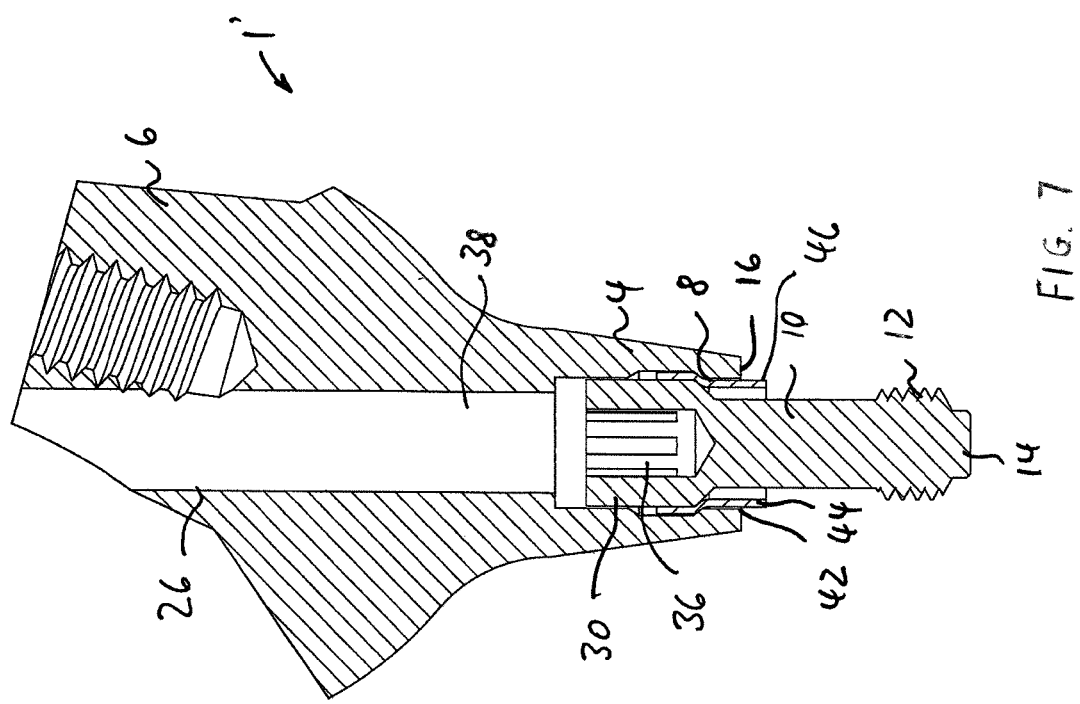
Figure 10:
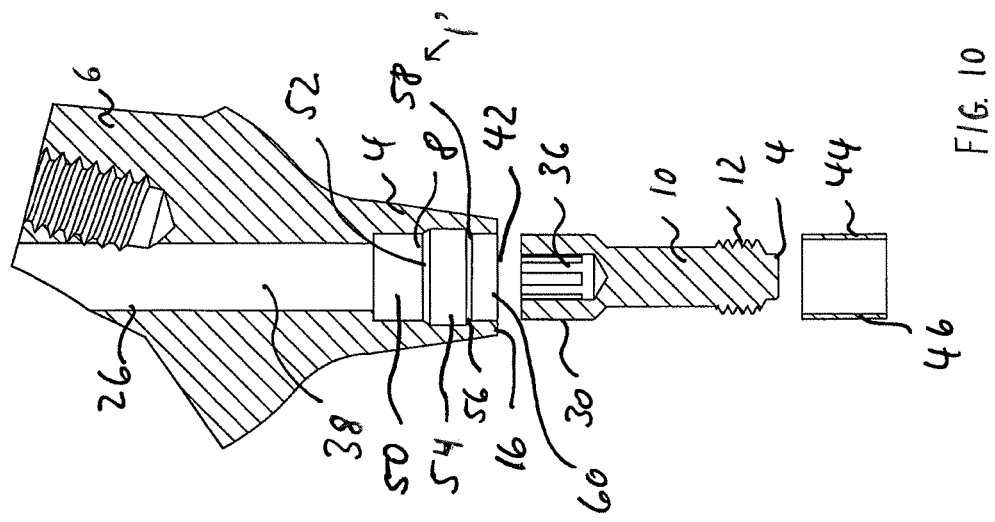
Figure 9:
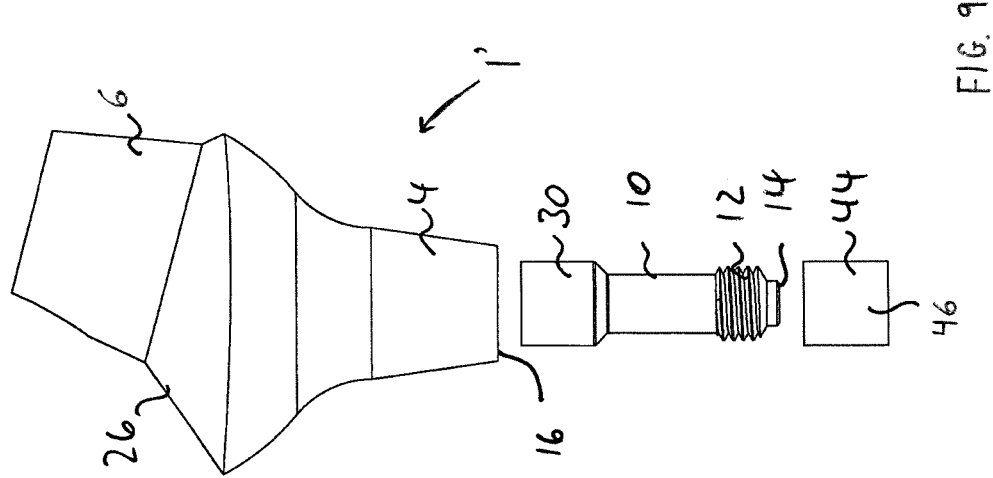
Figure 11:
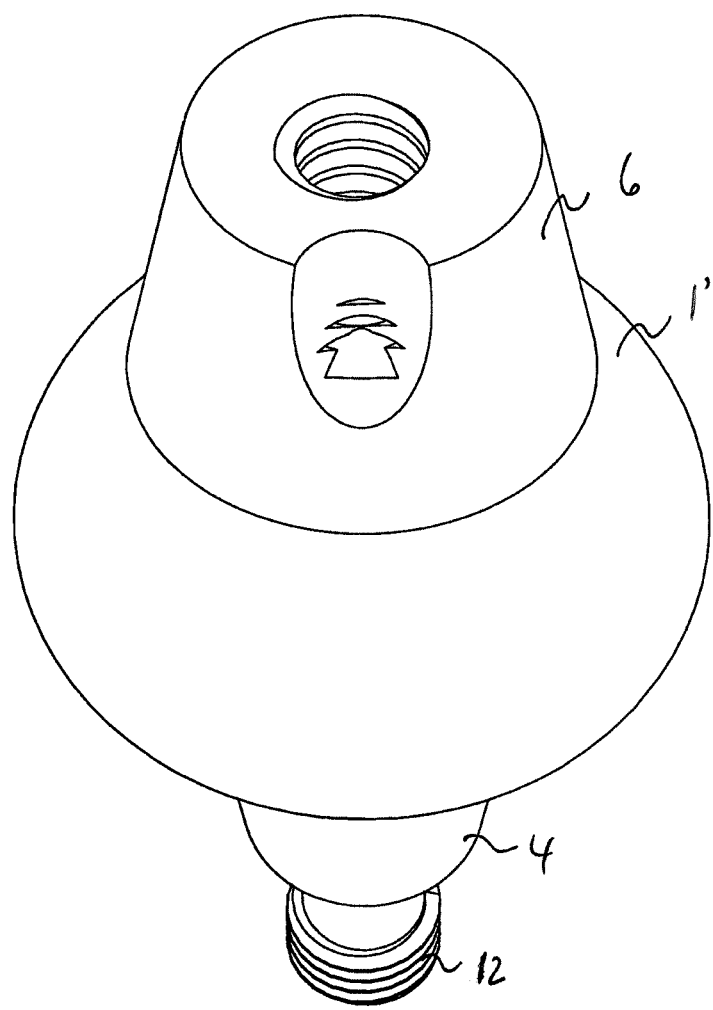
Figure 12:
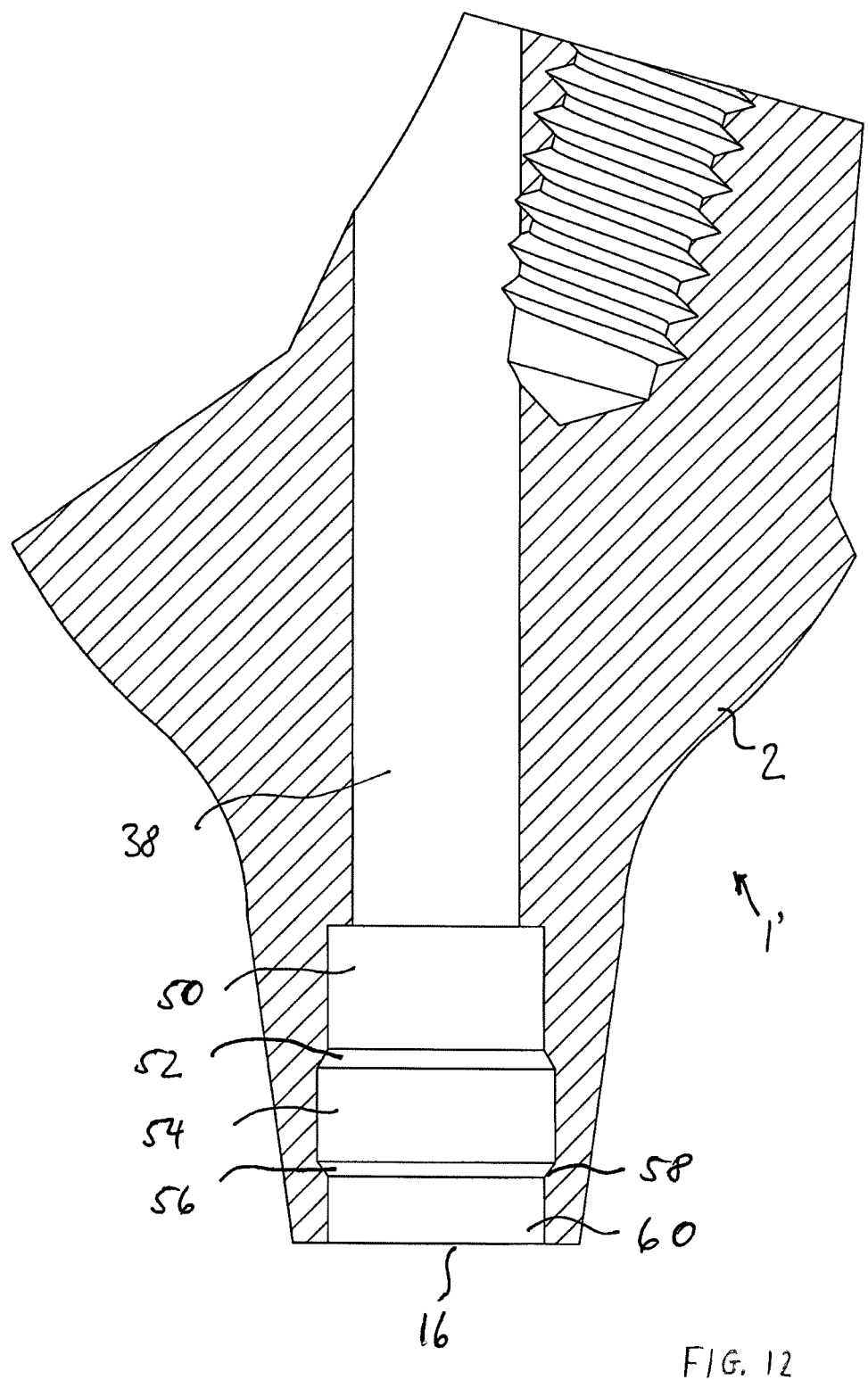

An exemplary embodiment of the invention is explained in detail by means of a drawing, in which FIG. 1 is a longitudinal section through an abutment provided for use with a dental implant according to the prior art, including the associated connecting screw in assembled condition, FIG. 2 is a side view of the abutment of FIG. 1, including the associated connecting screw, FIG. 3 is a lateral top view of the abutment of FIG. 1, FIG. 4 is a side view of the abutment of FIG. 1, FIG. 5 is an exploded side view of the abutment of FIG. 1, FIG. 6 is an exploded longitudinal section through the abutment of FIG. 1, FIG. 7 is a longitudinal section through an abutment provided for use with a dental implant according to the invention, including the associated connecting screw in assembled condition, FIG. 8 is a side view of the abutment of FIG. 7, including the associated connecting screw, FIG. 9 is an exploded side view of the abutment of FIG. 7, FIG. 10 is an exploded longitudinal section through the abutment of FIG. 7, FIG. 11 is a lateral top view of the abutment of FIG. 7, FIG. 12 shows an enlarged detail of FIG. 10, FIG. 13 shows steps of the assembly method for the abutment of FIG. 7, FIG. 14 is a longitudinal sectional view of an alternative embodiment of an abutment according to the invention in some steps of its production, FIG. 15 is a longitudinal sectional view or exploded view of another embodiment of an abutment according to the invention in some steps of its production, and FIG. 16 are longitudinal sectional views of various embodiments of a support ring.

Identical parts are identified in all figures by the same reference numbers.

The abutment 1 of FIGS. 1 to 6 is provided for use as connecting piece with a dental implant (not shown) inserted into the jaw bone of a patient and for fastening a dental prosthetics or denture piece. The abutment 1 comprises a base body 2 produced from a material suitably selected in view of the desired biocompatibility, preferably from a material based on titanium or from a ceramic material, onto which a connecting pin 4 is formed, which can be introduced into an associated receiving channel of the dental implant and whose dimensions are adapted to a possible indexing. The cross-section of the connecting pin 4 can be of a round design, of a non-round, for example hexagon, design for generating an indexing, or else a combination of round and non-round zones by segments, in the manner of a mixed design. Furthermore, the abutment 1 comprises an assembly pin 6, which is also formed onto the base body 2 and on which the dental prosthetics or denture piece can be fastened.

The cross-section of the assembly pin 6 can also be round, non-round, for example hexagon, for generating an indexing, or else a combination of round and non-round zones by segments, in the manner of a mixed design.

The abutment 1 is designed for being fastened on the associated dental implant by means of a screwed connection. For this purpose, a screw channel 8 is integrated into the connecting pin 6, in which a connecting screw 10 provided for connecting the abutment 1 to the associated dental implant is guided. The connecting screw 10 penetrates the screw channel 8, and in the introduced condition shown in FIG. 1, the free end 14 of the connecting screw 10, provided with an outer thread 12, protrudes over the apical end 16 of the abutment 1, which is provided for connection to the dental implant during assembly. During assembly on the associated dental implant, the outer thread 12 of the connecting screw 10 engages into a corresponding inner thread formed in the dental implant.

In the embodiment shown in FIGS. 1 to 6, the abutment 1 is designed as an angled abutment. The central or longitudinal axis 18 of the assembly pin 6 defining the latter's longitudinal direction is inclined against the central or longitudinal axis 20 of the connecting pin 4 defining the latter's longitudinal direction by an inclination angle, suitably chosen in view of the therapeutical situation, of, for example, 15°. The abutment 1 is designed for fastening the prosthetics or denture piece on the assembly pin 6 by means of a screwed connection. For this purpose, a drill hole 24 provided with an inner thread 22 is formed in the assembly pin 6.

The abutment 1 shown in FIGS. 1 to 6 is designed according to a variant common in the prior art, as regards bearing and guidance of the connecting screw 10 in the base body 2. The connecting screw 10 is introduced into the screw channel 8 from the "upper", occlusal end 26 of the abutment 1. For this purpose, a screw rest 28 is provided in this area of the base body 2 immediately adjacent to the screw channel 8, on which in assembled condition the screw head 30 of the connecting screw 10 rests and presses the abutment 1 onto the dental implant when the connecting screw 10 is screwed in. In adaption thereto, the connecting screw 10 comprises a preferably chamfered transition area 32 between the screw head 30 and the screw shaft 34, as can be seen particularly clearly in the exploded view of FIG. 5. This transition area 32 forms the screw-head seat with which the connecting screw 10 rests on the screw rest 28 in assembled condition. Accordingly, geometry and dimensioning of screw rest 28 and transition area 32 or screw-head seat are designed so as to be adapted to each other.

The screw head 30 is designed with a rotationally locking recess 36, in the exemplary embodiment a hexagon socket, with which a corresponding tool, for example a screw-driver, can be brought into engagement, in order to tighten the connecting screw 10. The access channel 38 associated with the screw rest 28, in which the screw head 30 is guided, has a sufficiently large free inner cross-section, so that the screw head 30 can be moved in the access channel 38 in longitudinal direction. The free inner cross-section of the access channel 38 is, therefore, larger than the diameter of the screw head 30. In this way, the access channel 38 also enables the engagement of the tool into the recess 36.

As can be seen in the exemplary representation, in particular in FIG. 6, this may lead to overlappings or intersections with the drill hole 24 or its inner thread 22 in the assembly pin 6, in an overlapping area 40, so that locally, only small material thicknesses are available or parts of the thread concerned are completely impaired. Both these facts may entail a weakening of the local structure and a reduction of the mechanical strength and stressability, in particular of the screwed connection.

To counteract that, the exemplary embodiment of an abutments 1' according to the invention shown in FIGS. 7 to 12, presents a guidance of the connecting screw 10 which is fundamentally different from that of the known abutment 1. In the following explanations, the abutment 1' is designed as an angled abutment; alternatively, however, also a straight-line embodiment can of course be provided, wherein the longitudinal axis 18 of the assembly pin 6 is oriented in parallel to the longitudinal axis 20 of the connecting pin 4.

In the embodiment of the abutment 1' according to the invention, the screw channel 8 provided for receiving and guiding the connecting screw 10 is designed and dimensioned such that the connecting screw 10 can be introduced—with its screw head 30 ahead—into the screw channel 8 from "below", i.e. from the apical end 16. To enable this, the free inner diameter of the screw channel 8 over the latter's entire length up to its opening 42 on the end face is at least as large as the diameter of the screw head 30 of the connecting screw 10, in the embodiment according to the invention. In this way, it is achieved that the screw head 30 can now be moved in longitudinal direction in the screw channel 8 properly speaking.

Consequently, the access from the "upper", occusal end 26 of the abutment 1' to the screw head 30 is in this embodiment only necessary for bringing a suitable tool, such as, for example, a screw-driver, into engagement with the screw head 30, for example in order to tighten the connecting screw 10. This can be effected via the access channel 38. Said access channel 38 can now be designed with a clearly reduced free inner cross-section, in comparison with the known systems, because it is no longer necessary to guide the screw head 30 in its full width through said channel. Therefore, the material thicknesses in the adjacent area of the base body 2 can be clearly increased, so that the effects of any overlappings with the adjacent drill holes 24 etc. are clearly diminished. These effects are clearly visible in the perspective side view of FIG. 11. In the alternative embodiment of the abutment 1' according to the invention, with an assembly pin 6 extending in a straight line, on the other hand, it is a substantial advantage that in this case an inner thread 22 possibly formed into the assembly pin 6 does no longer have to be larger than the screw head 30, with regard to its thread core, as is necessary in the present systems, which might possibly entail very small material thicknesses in the local environment in the base body 2. It is rather possible now, with the abutment 1' according to the invention, to dimension the thread core of such an inner thread 22 in the assembly pin 6 relatively small, so that relatively large wall thicknesses remain in the surrounding areas.

To enable the assembly of the abutment 1' on the dental implant by means of the connecting screw 10 in this variant, too, the screw head 30 of the connecting screw 10 rests in apical direction, i.e. towards the opening 42 on the end face of the screw channel 8, on a retaining element 44 introduced into the screw channel 8 after the connecting screw 10. In the exemplary embodiment, a support ring 46 pressed into the screw channel 8 is provided as retaining element 44. To make it possible to suitably introduce said support ring 46 and use it as a rest, the screw channel 8 is, furthermore, designed in several segments in this embodiment, as is clearly visible in particular in the sectional view of FIG. 10.

To receive the screw head 30, the screw channel 8 comprises a first segment 50, whose end face merges directly into the access channel 38 and whose free diameter is slightly larger than the outer diameter of the screw head 30, so that the latter can easily be rotated about its longitudinal axis within the first segment 50. Said first segment 50 is followed by a second segment 54 of the screw channel 8—in the exemplary embodiment, via a transition area 52. In said second segment 54, the cross-section of the screw channel 8 is enlarged or expanded as compared with the first segment 50. This subdivision into the first segment 50 and the second segment 54, provided in the exemplary embodiment, is not absolutely necessary for the present invention, but offers the advantage that through the fact that the diameter of the first segment 50 is reduced as against the second segment 54, relatively large wall thicknesses in the base body 2 and thus correspondingly increased strength values can be achieved in the environment of said first segment 50.

The second segment 54, in turn, merges into a third segment 60, viewed in direction of the apical end 16, in a transition area 56, under formation of a support edge 58, which is chamfered in the exemplary embodiment. The inner cross-section or inner diameter of the third segment 60 is reduced as against the second segment 54; that means that the inner cross-section of the screw channel 8 tapers from the second segment 54 to the third segment 60. For more clarity, these parts are shown once more in FIG. 12 in an enlarged representation.

As an important element of the present invention, it is provided to plastically deform the support ring 46 afterwards introduced into the screw channel 8, in order to support the screw head 30. Accordingly, the support ring 46 is preferably made from a material suitably selected for such a plastic deformation, preferably a metallic material, in particular a material based on titanium. For the intended plastic deformation, one uses in the exemplary embodiment the deformation edge which is formed on the connecting screw 10 by the transition area 32 at the transition point from the screw head 30 into the screw shaft 34.

Figure 13B:
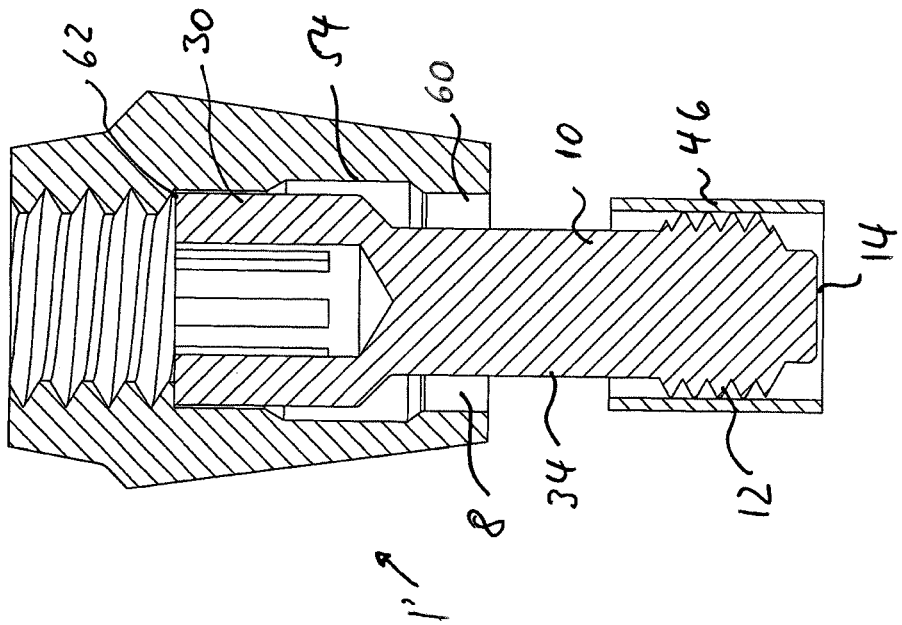
Figure 13A:
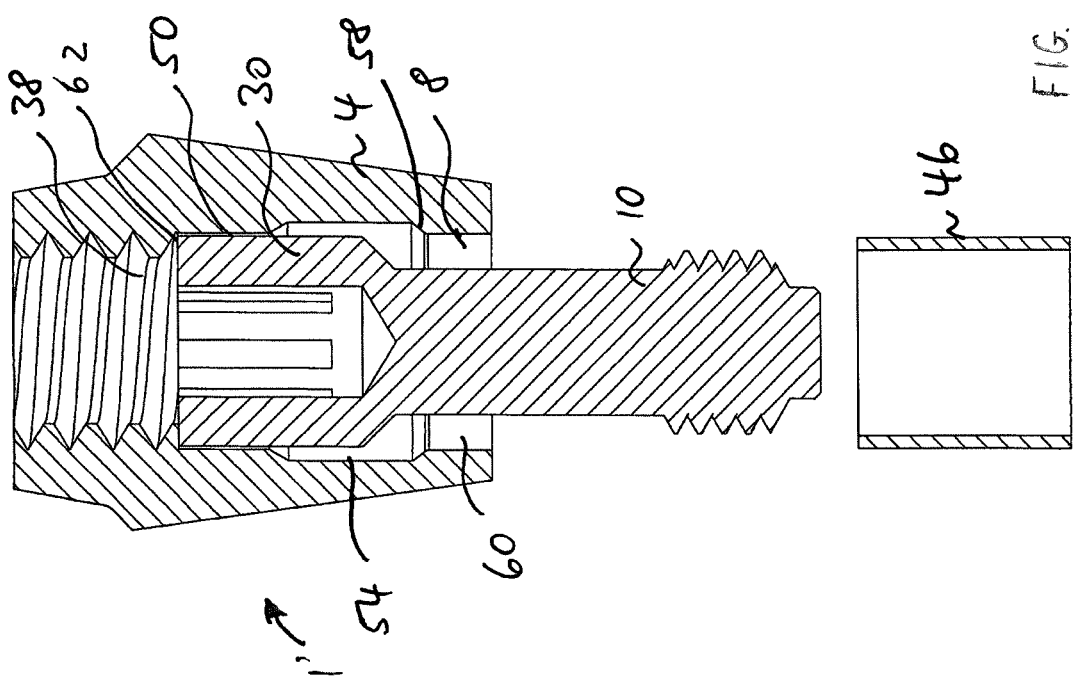

The method for producing or finally assembling the abutment 1' as a usable component to be then inserted in the patient's mouth, which is considered as independently inventive, is explained in detail by means of the sequence of the sectional views in FIGS. 13*a* to 13*e*. In the representation of FIG. 13, the abutment 1' is designed as a straight-line embodiment. With regard to the production method, FIG. 13*a* shows the first step of the final assembly, wherein the connecting screw 10, with its screw head 30 ahead, is first of all introduced into the screw channel 8. The screw head 30 is introduced into the screw channel 8 up to the limit stop, said limit stop 62 being given by the taper of the free cross-section at the transition of the screw channel 8 into the access channel 38. The support ring 46 provided for serving as retaining element 44, made in the exemplary embodiment from a material based on titanium, has not yet been introduced in this phase.

In the second step, shown in FIG. 13*b*, the support ring 46 is guided over the free end 14, the outer thread 12 and the shaft 34 of the connecting screw 10 gefuhrt and introduced into the screw channel 8. For this purpose, the support ring 46 has a sufficiently large free inner cross-section. Alternatively, the support ring 46 can also be of a slotted or multi-part design, so that it can be pushed over the shaft 34 of the connecting screw 10 and any parts situated in front thereof, in particular the outer thread 12. In the screw channel 8, the support ring 46 is introduced up to the stop formed by the screw-head seat formed by the transition area 32 (cf. FIG. 13*c*). For this purpose, the outer diameter of the screw head 30 is sufficiently large, so that the support ring 46 cannot be pushed over said screw head 30.

Figure 13D:
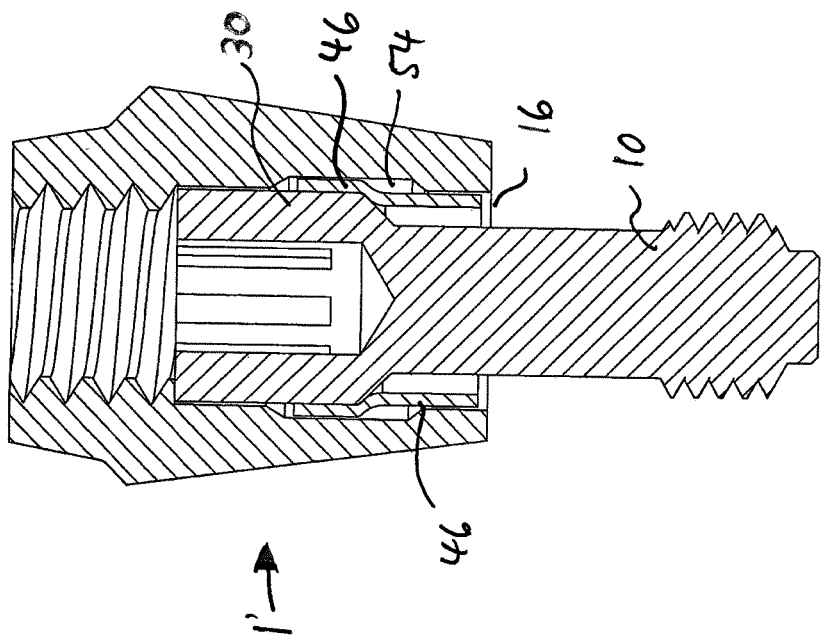
Figure 13C:
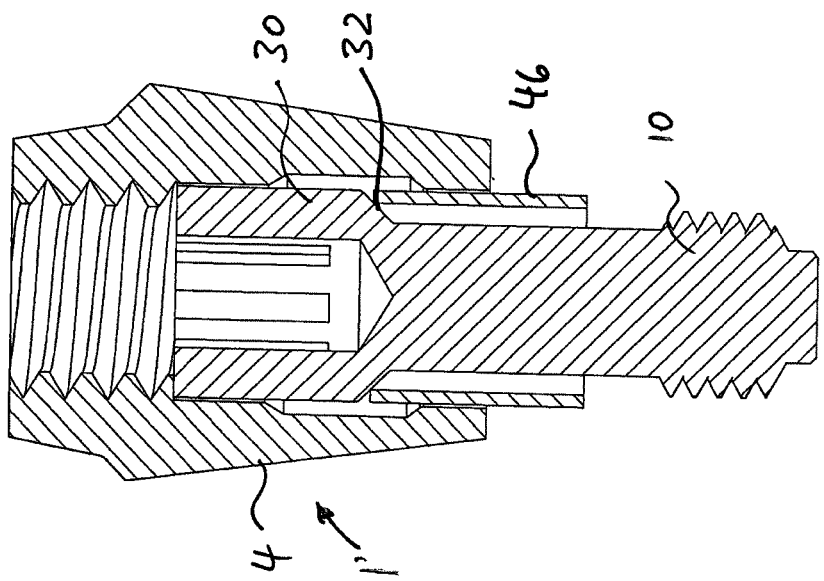

Then, the support ring 46 is pressed into the screw channel 8 and against the screw head 30, whereby it is plastically deformed and expanded, taking the shape shown in FIG. 13*d*. That means that the screw head 30 is used in this step as a stamping or pressing tool for deforming the support ring 46. In this regard, the transition area 32 provided as a deformation edge can be of a suitable design, for example in view of its geometrical parameters, such as, for example, the angle of inclination or angle of taper or a suitable rounding in its flank profile. This deformation creates the structure of which FIG. 13*e* shows an enlarged detail, the upper, plastically deformed area of the support ring 46 encompassing the screw head 30. Consequently, the plastically deformed support ring 46 forms a reliable mechanical bond with the encompassed screw head 30.

Figure 13F:
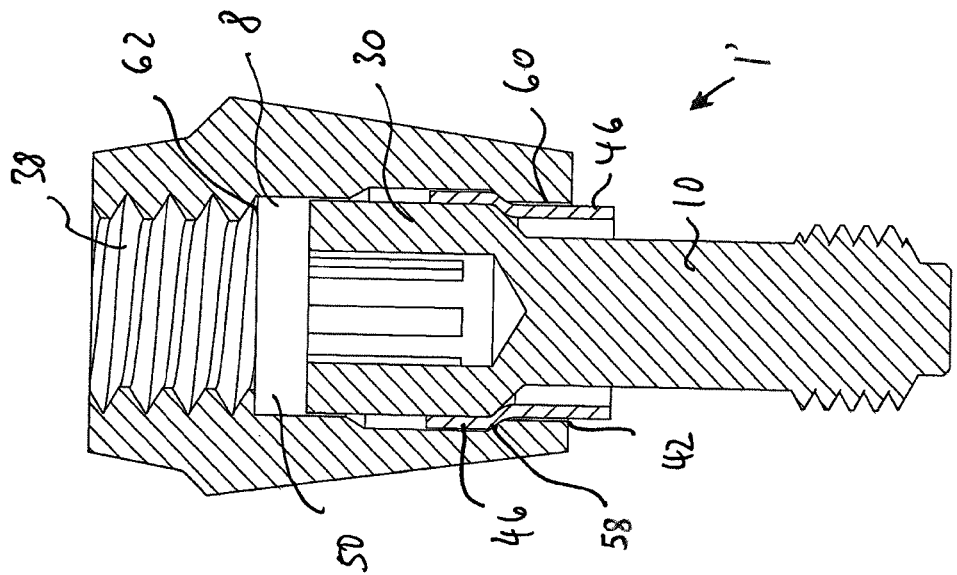
Figure 13E:
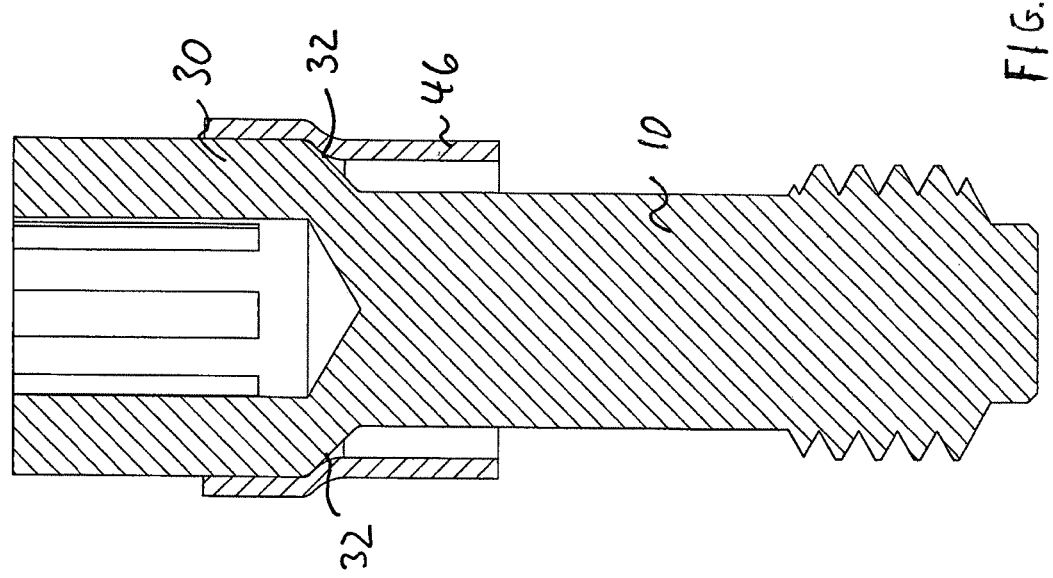

In the last step, shown in FIG. 13*f*, the connecting screw 10 is shifted in the screw channel 8 towards the latter's opening 42 on the end face at the apical end 16, until the deformed part of the support ring 46 hits the support edge 58 and is possibly further deformed there. Thus, the support edge 58 forms a reliable bearing face for the screw head 30. The support ring 46 provided as retaining element 44, for its part, also suitably rests on the screw channel 8 and, thus, on the base body 2 of the abutment 1'.

Figure 14B:
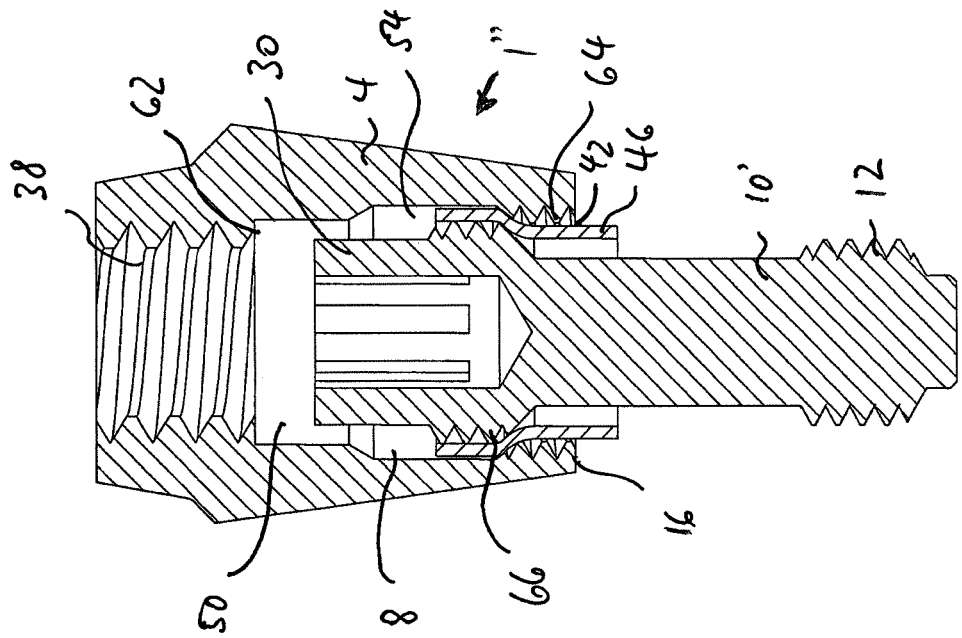
Figure 14A:
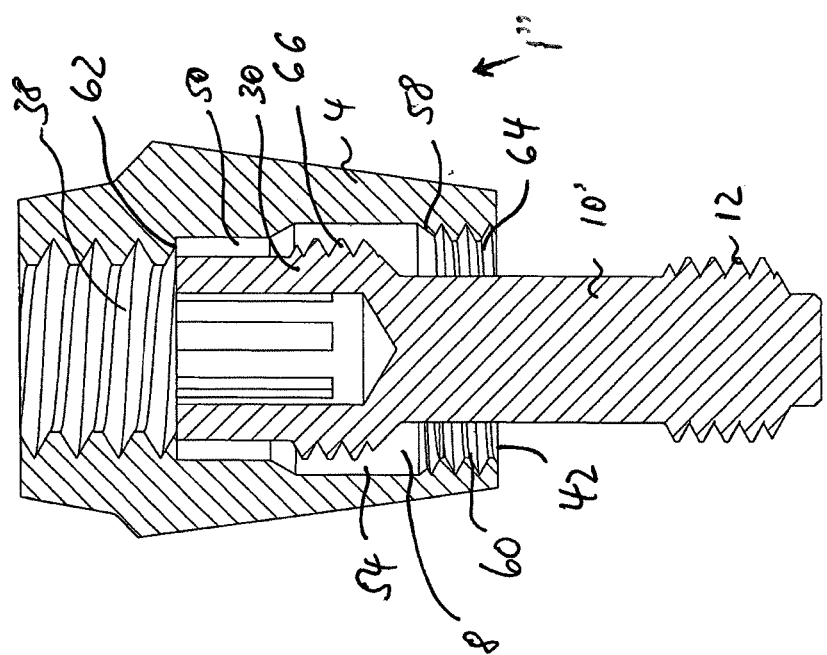

In an alternative embodiment of the abutment 1", which is also considered as independently inventive, shown in FIG. 14, a particularly large stability-promoting material thickness and also bearing face is provided in the segment 60 of the screw channel 8. For this purpose, the segment 60 is provided with an inner thread 64 corresponding with an outer thread 66 formed on the screw head 30 of the connecting screw 10'. The thread pairing consisting of the inner thread 64 and the outer thread 66 is preferably designed as a left-hand thread. For the final assembly of the abutment 1", whose two essential steps are shown in FIGS. 14*a* and 14*b*, the connecting screw 10' is first of all screwed into the corresponding inner thread 64, via the outer thread 66 arranged on the screw head 30, until the outer thread 66 has passed the inner thread 62 and the screw head 30 is located inside the screw channel 8 and can be advanced up to the limit stop 62. In this sense, this thread-based embodiment is understood as having the same effect as the criterion that the free inner diameter of the screw channel 8 over its entire length up to the opening 42 on the end face is at least as large as the diameter of the screw head 30 of the connecting screw 10, because the desired passability of the connecting screw 10' into the screw channel 8 is now given through the screw-in movement and through the thread engagement. FIG. 14a shows the inserted condition. Then, analogously to the above-described variant, the support ring 46 is pushed into the screw channel 8 and plastically deformed, among others by means of the screw head 30. Then, the connecting screw 10' is shifted in the screw channel 8 towards the latter's opening 42 on the end face at the apical end 16; this condition is shown in FIG. 14b.

In a further preferred development, shown in FIG. 15, the support ring 46', too, is provided with an outer thread 68, which also corresponds with the inner thread 62, i.e. which can be brought into engagement with the latter. An abutment modified in this manner, which is also considered as independently inventive, is shown in FIG. 15a in an exploded side view and in FIG. 15b in an exploded longitudinal sectional view. During the final assembly of this abutment 1''', the connecting screw 10' is also first of all screwed into the corresponding inner thread 64, via the outer thread 66 arranged on the screw head 30, until the outer thread 66 has passed the inner thread 62 and the screw head 30 is located inside the screw channel 8 and can be advanced up to the limit stop 62. Then, the outer thread 68 of the support ring 46' is screwed into the inner thread 64. FIG. 15c is a longitudinal sectional view of this condition. The support ring 46' is dimensioned such that, after it has been screwed in completely, its edge 70 is positioned inside the screw channel 8 on the inside of the support edge 58.

Figure 15B:
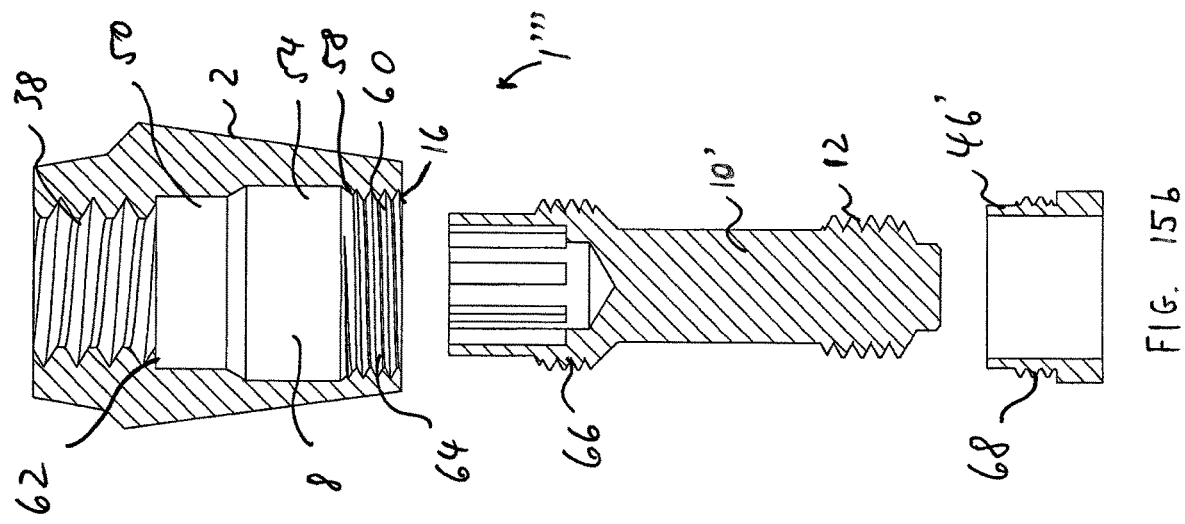
Figure 15A:
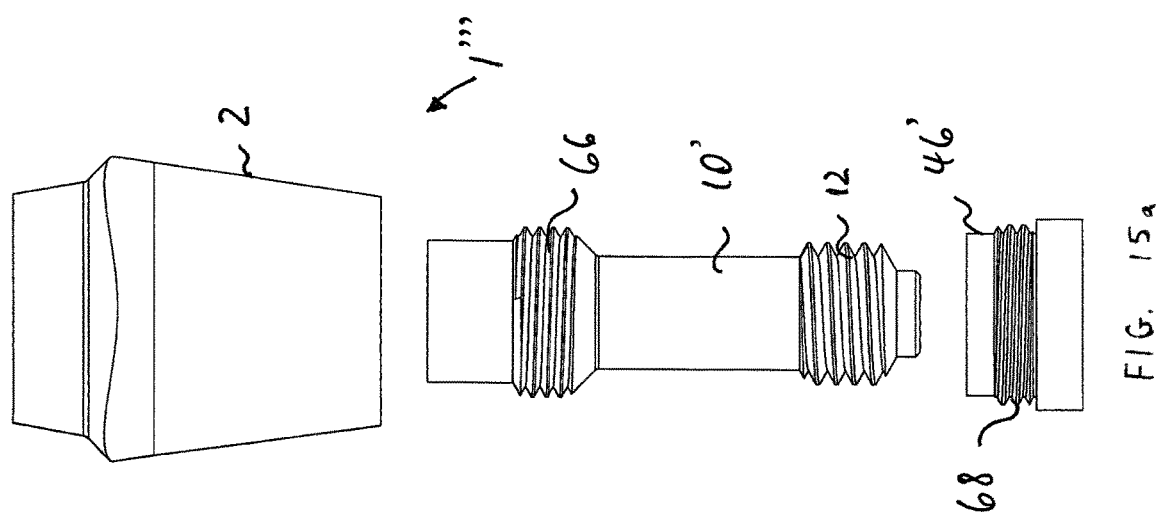
Figure 15D:
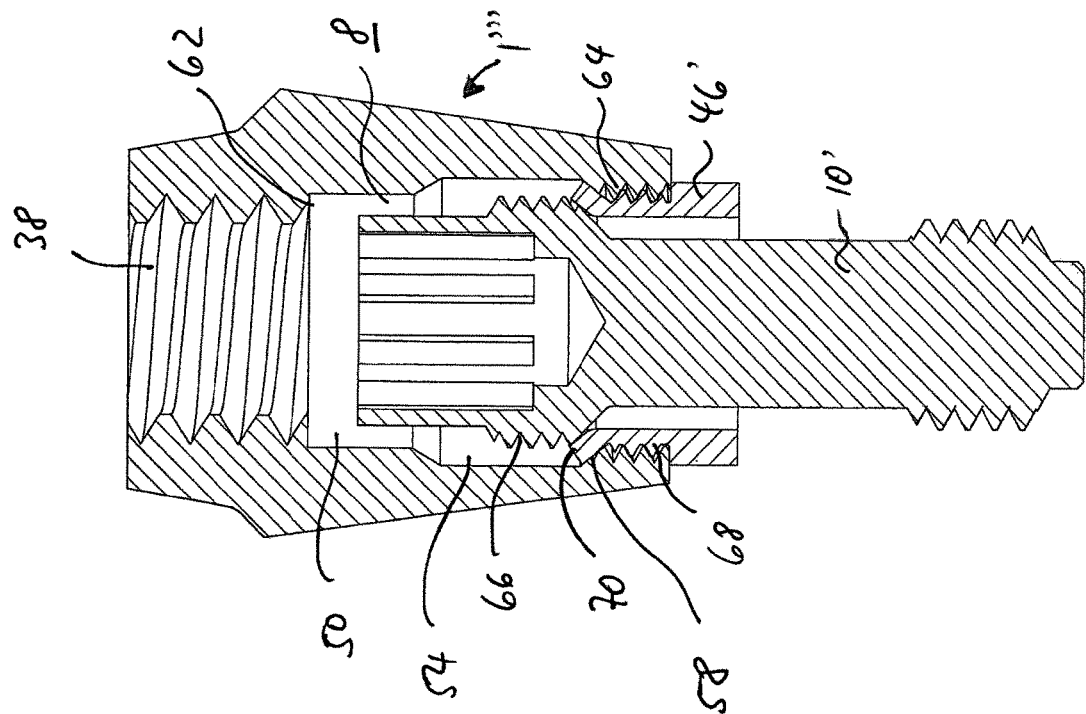
Figure 15C:
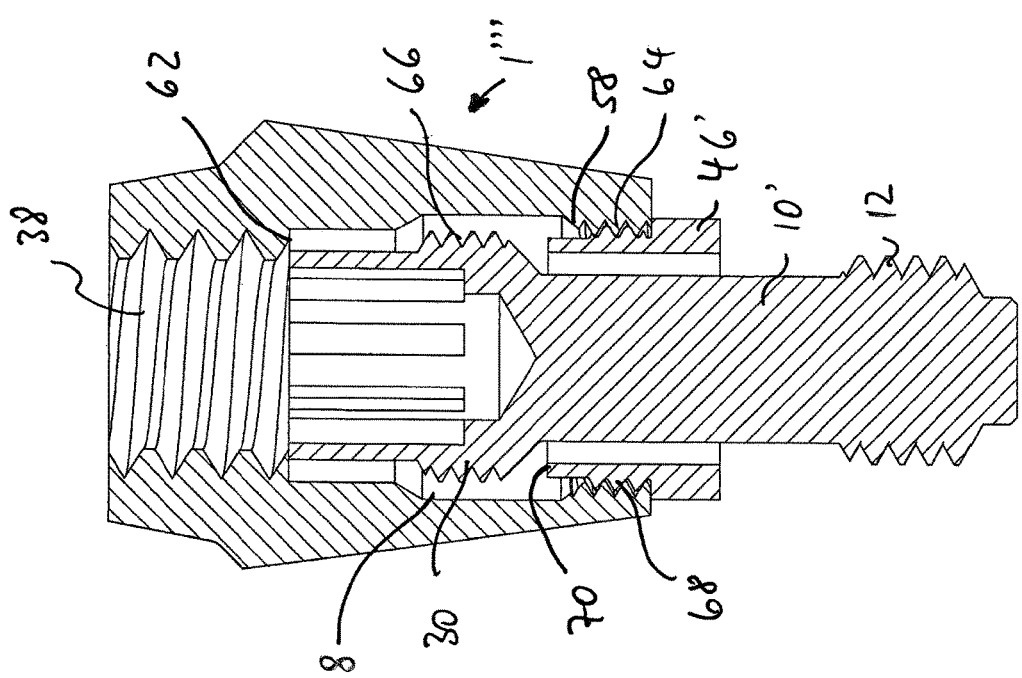

In the last step, shown in FIG. 15d, the connecting screw 10' is, here too, shifted in the screw channel 8 towards the latter's opening 42 on the end face at the apical end 16, until the transition area 32 between the screw shaft 34 and the screw head 30 hits the edge 70. When the connecting screw 10' is shifted further in the direction of the apical end 16, the support ring 46' is increasingly deformed, from its edge 70, until it adapts itself to the deformation edge 58. It this way, the plastically deformed support ring 46' forms, on the one hand, a reliable mechanical bond with the encompassing screw channel 8, and, on the other hand, a reliable bearing face for the screw head 30 is formed. Thus, support ring 46' provided as retaining element 44, for its part, also suitably rests on the screw channel 8 and, thus, on the base body 2 of the abutment 1'''. The support ring 46' screwed in via the outer thread 68 offers, furthermore, the advantage that it inhibits or prevents an undesired engagement of the outer thread 66 arranged on the screw head 30 into the inner thread 64, when the connecting screw 30 is tightened.

Of course, all above-mentioned components are suitably dimensioned and their sizes and other dimensions are suitably adapted to each other in relation to each other, so that the processing steps described above are possible.

For the support ring 46, different thread configurations can be provided in general and as a function of the design of the other components, as shown in FIG. 16 in a longitudinal sectional view. One could imagine a support ring 46 without thread (FIG. 16a), with an outer thread 68 only, which is preferably adapted to the inner thread 64 and, therefore, identical with the outer thread 66 on the screw head 30 (FIG. 16b), with such an outer thread 68 and an additional inner thread 72, preferably adapted to the outer thread 12 of the connecting screw 10, 10' (FIG. 16c) or only with this inner thread 72 (FIG. 16d).

LIST OF REFERENCE NUMBERS

1 Abutment
2 Base body
4 Connecting pin
6 Assembly pin
8 Screw channel
10, 10' Connecting screw
12 Outer thread
14 Free end
16 Apical end
18, 20 Longitudinal axis
22 Inner thread
24 Drill hole
26 Occlusal end
28 Screw rest
30 Screw head
32 Transition area
34 Screw shaft
36 Recess
38 Access channel
40 Overlapping area
42 Opening on the end face
44 Retaining element
46 Support ring
50 Segment
52 Transition area
54 Segment
56 Transition area
58 Support edge
60 Segment
62 Limit stop
64 Inner thread
66,68 Outer thread
70 Edge
72 Inner thread

The invention claimed is:

1. An abutment for use with a dental implant inserted into a jaw bone of a patient, comprising:
   a connecting pin configured to be introduced into an associated receiving channel of the dental implant, the connecting pin forming a screw channel for a connecting screw for connecting the abutment to the dental implant, wherein the screw channel has a first segment having a first inner diameter greater than an exterior diameter of a screw head of the connecting screw, the first segment being configured to form a space around the screw head, and a second segment having a second inner diameter that is smaller than the first inner diameter and is configured to initially receive the screw head during introduction of the connecting screw into the screw channel; and
   a plastically deformable retaining element configured to be introduced into the screw channel after the connecting screw to thereby support the connecting screw, a first portion of the plastically deformable retaining element being configured to, as the plastically deformable retaining element is introduced into the screw channel, contact a chamfered transition area of the connecting screw and plastically deform from a cylindrical shape having a diameter less than the exterior diameter of the screw head into an internal surface that abuts the screw head, and the first portion is connected to a second end portion of the plastically deformable retaining element, the second end portion comprising a second cylindrical shape having the diameter less than the exterior diameter of the screw head and being concentric with the first portion.

2. The abutment of claim 1, wherein the retaining element comprises a support ring configured to be pressed into the screw channel.

3. The abutment of claim 2, wherein the support ring comprises a peripheral bead configured to engage a corresponding peripheral groove in the screw channel.

4. The abutment of claim 2, wherein the support ring is configured to be threadedly engaged with the connecting pin to fix the support ring with respect to the connecting pin.

5. The abutment of claim 2, wherein the support ring is configured to be threadedly engaged with the connecting pin and abut the connecting screw.

6. The abutment of claim 1, further comprising an assembly pin configured to fasten a prosthetic element, the assembly pin having a longitudinal axis forming a tilting angle of 15° to 30° with respect to a longitudinal axis of the screw channel.

7. A method for affixing an abutment to a dental implant, comprising:
   providing the abutment comprising:
      a connecting pin forming a screw channel for a connecting screw, wherein the screw channel has a first segment having a first inner diameter greater than an exterior diameter of a screw head of the connecting screw, the first segment being configured to form a space around the screw head, and a second segment having a second inner diameter that is smaller than the first inner diameter and is configured to initially receive the screw head during introduction of the connecting screw into the screw channel; and
      a plastically deformable retaining element;
   introducing the connecting screw into the screw channel from a distal end of the screw channel;
   urging a first portion of the plastically deformable retaining element into the screw channel; and
   contacting the first portion against a chamfered transition area of the connecting screw and plastically deforming the first portion from a cylindrical shape having a diameter less than the exterior diameter of the screw head into an internal surface that abuts the screw head, wherein after such plastic deformation, the first end portion has an internal surface that abuts the screw head, and the first portion is connected to a second end portion of the plastically deformable retaining element, the second end portion comprising a second cylindrical shape having the diameter less than the exterior diameter of the screw head and being concentric with the first portion.

8. The method of claim 7, further comprising plastically deforming the retaining element after affixing the retaining element to the connecting pin.

* * * * *